United States Patent
Nakamoto

(10) Patent No.: US 8,971,077 B2
(45) Date of Patent: Mar. 3, 2015

(54) POWER SUPPLY CIRCUIT, MOBILE TERMINALS USING THE SAME, AND CONTROL METHOD OF THE SAME

(71) Applicant: Fujitsu Limited, Kawasaki-shi, Kanagawa (JP)

(72) Inventor: Hiroyuki Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 13/760,732

(22) Filed: Feb. 6, 2013

(65) Prior Publication Data
US 2013/0249509 A1 Sep. 26, 2013

(30) Foreign Application Priority Data
Mar. 26, 2012 (JP) ................................. 2012-069538

(51) Int. Cl.
*H02M 3/156* (2006.01)
*G05F 1/46* (2006.01)

(52) U.S. Cl.
CPC ..................................... *G05F 1/468* (2013.01)
USPC ................. 363/89; 363/79; 323/285

(58) Field of Classification Search
USPC ........... 363/16, 20, 49, 60, 71–74, 79, 80, 89, 363/97; 323/207, 222, 224, 247, 285
See application file for complete search history.

(56) References Cited

U.S. PATENT DOCUMENTS

| 5,513,141 A * | 4/1996 | Offord ..................... 365/189.05 |
| 7,042,281 B2 * | 5/2006 | Baglin et al. .................. 327/541 |
| 7,199,565 B1 * | 4/2007 | Demolli ........................ 323/273 |
| 7,310,248 B2 * | 12/2007 | Mori ......................... 363/21.16 |

FOREIGN PATENT DOCUMENTS

| JP | 2009-124844 A | 6/2009 |
| JP | 2010-273446 A | 12/2010 |
| JP | 2011-072101 A | 4/2011 |

* cited by examiner

*Primary Examiner* — Rajnikant Patel
(74) *Attorney, Agent, or Firm* — Arent Fox LLP

(57) ABSTRACT

A power supply circuit includes: a first switch and a second switch that are connected in series between an input voltage terminal and a reference power supply; a controller that controls the first and second switches to be turned on and off by turns; a comparator that has an inverting input terminal connected to a voltage supply and that has a non-inverting input terminal connected to a first terminal of a capacitor; a third switch that is provided between an output terminal and the non-inverting input terminal of the comparator; a fourth switch that is provided between a connection node of the first and second switches, and a second terminal of the capacitor; and a latch circuit that detects change of output of the output terminal of the comparator and controls the second switch to be turned off.

14 Claims, 10 Drawing Sheets

POWER SUPPLY CIRCUIT, MOBILE TERMINALS USING THE SAME, AND CONTROL METHOD OF THE SAME

CROSS-REFERENCE TO RELATED APPLICATION

This application is based upon and claims the benefit of priority of the prior Japanese Patent Application No. 2012-69538, filed on Mar. 26, 2012, the entire contents of which are incorporated herein by reference.

FIELD

The embodiments discussed herein are related to a power supply circuit, a mobile terminal using the power supply circuit, and a control method of the power supply circuit.

BACKGROUND

A power supply circuit converts input voltage to output voltage being different from the input voltage. The power supply circuit that performs such a voltage conversion is also referred to as a DC-DC converter, and is widely used for a mobile phone and a mobile terminal that includes a low power LSI.

FIG. 1 illustrates a block diagram of a general wireless transmission terminal. FIG. 1 illustrates an example of the transmission terminal in which a signal from a baseband processor is converted to a signal of an RF (Radio Frequency) band by an RF transmitter, and the signal is amplified by a power amplifier (PA) and transmitted from an antenna. The DC-DC converter supplies each circuits with power desired for each of the circuits.

FIG. 2 illustrates a circuit diagram of a common DC-DC converter. The DC-DC converter includes a first switch M1, a second switch M2, an output inductor L, and a control unit 80. The first switch M1 and the second switch M2 are connected in series between an input voltage terminal IN for receiving input voltage Vin and a reference terminal for supplying reference power supply voltage (for example, ground) that is lower than the input voltage. The output inductor L, such as a coil, is provided between a connection node (or connection point) LX of the first and second switches and an output terminal OUT for supplying output voltage Vout. The control unit 80 alternately switches, with a certain switching cycle, between the first switch M1 and the second switch M2 depending on the difference between a target voltage and the output voltage Vout. A smoothing capacitor C is connected to the output terminal OUT to constitute a smoothing circuit for smoothing the output voltage Vout.

The first switch M1, which is a high-side transistor, is a P-channel MOS transistor and operated by the control unit 80 with a gate drive signal VC that is generated by the control unit. The second switch M2, which is a low-side transistor, is an N-channel MOS transistor and operated by the control unit 80 with a gate drive signal VC that is generated by the control unit.

The gate of the first switch M1 and the gate of the second switch M2 are connected to a buffer B3 and a buffer B4, respectively, that perform level conversion of the gate drive signal VC generated by the control unit 80.

A resistor R that is connected to the output terminal OUT represents a load circuit of an LSI, etc. that receives voltage supplied by the DC-DC converter.

In this kind of DC-DC converter, increase in loss at a light load state, that is, reduction of efficiency is often seen as a problem.

FIG. 3 shows a timing chart describing a problem at a light load state or a no-load state. The signal VC that controls the first switch M1 and the second switch M2 is output from the control unit 80, and the first switch M1 is turned on and the second switch M2 is turned off when the signal VC is in a high level.

At this time, when a voltage of the input voltage terminal IN is represented by VIN, current that flows through the output inductor L is charged to the smoothing capacitor C in accordance with a slope of (VIN−VOUT)/L illustrated in FIG. 3, and an output potential VOUT is gradually increased. Next, the signal VC is set to a low level by the control unit 80, the first switch M1 is turned off, and the second switch M2 is turned on. At this time, current that flows through the output inductor L is charged to the smoothing capacitor C in accordance with a slope of (−VOUT)/L illustrated in FIG. 3 while gradually reducing the current value, and then the output potential VOUT is gradually reduced.

The control unit 80 switches between the first switch M1 and the second switch M2, depending on the difference between the output voltage Vout and the target voltage. In the case illustrated in FIG. 3, a ripple component is suppressed to the region between potentials VH and VL. By repeating the switching operation, the output potential VOUT has a repetitive waveform between potentials VH and VL, so that a DC-power supply as a fixed potential may be obtained. The value of VOUT depends on a rate (duty) of time periods during which the first switch M1 and the second switch M2 are turned on and off. For example, when a time during which the first switch M1 is turned on becomes longer, that is, when the duty is higher, the potential of VOUT becomes a high DC potential. When the duty is 50% as illustrated in FIG. 3, "VOUT=VIN/2" is satisfied.

On the other hand, a potential VLX of the node of connection point LX between the first switch M1 and the second switch M2 is reduced to a potential lower than the GND level by turning on the second switch M2. This is why, even after the second switch M2 is turned on, the output inductor L works to maintain the electric current IL which flows through the output inductor L while the first switch M1 is turned on. Thus, the potential VLX is reduced to a GND level or less, and the current IL flows from the GND to the VOUT.

When the first switch M1 is turned on, the opposite phenomenon occurs such that the node potential VLX is increased to a positive potential and the current IL is maintained even after the switching. Therefore, as illustrated in FIG. 3, the node potential VLX has a waveform that is obtained by inverting positive and negative potentials.

Here, a case is assumed in which load current of the DC-DC converter is significantly small, for example, the wireless transmission terminal that is illustrated in FIG. 1 is in a power-down mode that is a state in which a signal is not transmitted such as a state in which a desired current amount becomes small. Generally, this state is referred as a light load. In the light load state, as illustrated by the broken line of FIG. 3, the current IL that flows through the output inductor L becomes markedly small. In this state, the slope of the current IL is not changed because the slope is uniquely determined by the output inductor L and the potential difference between VIN and VOUT, so that there is a time period during which the current IL that flows through the output inductor L becomes negative. In the time period, the current IL flows from the output terminal OUT side of the output inductor L to the connection node LX side, charges are discharged from the smoothing capacitor C. The node potential VLX becomes as illustrated by the broken line, and charges that have been charged to the smoothing capacitor C are discharged to the GND side through the second switch M2 without supplying the charges to the load circuit by turning the node potential VLX to positive voltage. This causes a problem of "reduction of efficiency in the light load state".

The followings are reference documents.

[Document 1] Japanese Laid-open Patent Publication No. 2009-124844,
[Document 2] Japanese Laid-open Patent Publication No. 2010-273446, and
[Document 3] Japanese Laid-open Patent Publication No. 2011-72101.

SUMMARY

According to an aspect of the embodiments, a power supply circuit includes: a first switch and a second switch that are connected in series between an input voltage terminal and a reference power supply; a controller that controls the first and second switches to be turned on and off by turns; a comparator that has an inverting input terminal connected to a voltage supply and that has a non-inverting input terminal connected to a first terminal of a capacitor; a third switch that is provided between an output terminal and the non-inverting input terminal of the comparator; a fourth switch that is provided between a connection node of the first and second switches, and a second terminal of the capacitor; and a latch circuit that detects change of output of the output terminal of the comparator and controls the second switch to be turned off.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The embodiments are described in detail below with reference to accompanying drawings.

Figure 4:
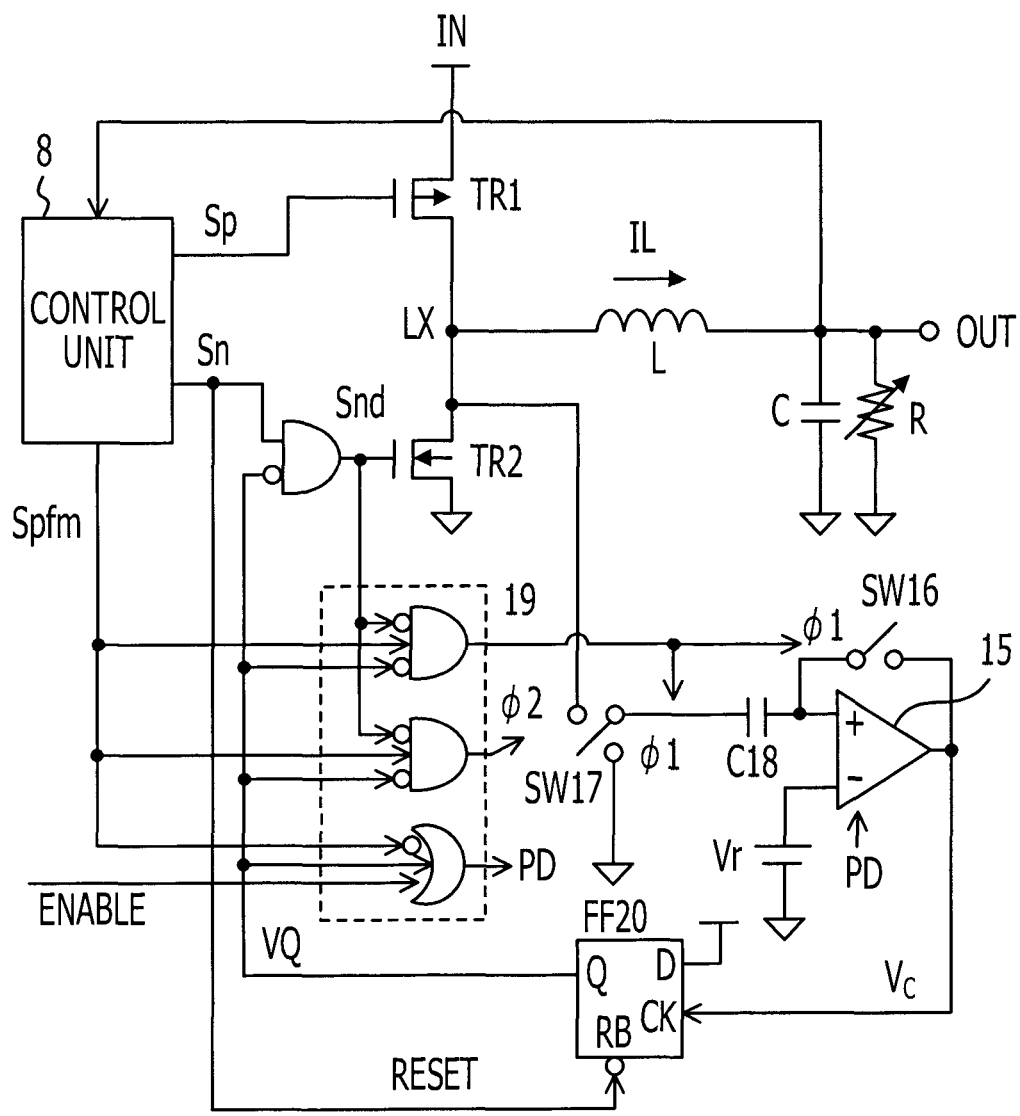
FIG. 4 illustrates a circuit diagram of a DC-DC converter according to a first embodiment.

FIG. 4 illustrates a circuit diagram of a DC-DC converter according to a first embodiment to which the disclosed technology is applied. The embodiments are described below with reference to accompanying drawings.

The DC-DC converter in FIG. 4 includes, a first switch TR1 and a second switch TR2 that are connected in series between an input voltage terminal IN to which input voltage Vin is applied and reference power supply voltage (for example, ground) that is lower than the input voltage, an output inductor L of a coil, etc. that is provided between a connection node (or connection point) LX of the first and second switches and an output terminal OUT from which output voltage Vout is output, and a control unit 8 that controls the first switch TR1 and the second switch TR2 by turns depending on a difference between the output voltage Vout and a target voltage, with a certain switching cycle.

The first switch TR1 is the high-side transistor that is constituted by a P-channel MOS transistor, and conductive or non-conductive control is performed on the first switch TR1 by a gate drive signal Sp that is generated by the control unit 8.

The second switch TR2 is the low-side transistor that is constituted by an N-channel MOS transistor, and conductive or non-conductive control is performed on the second switch TR2 by a gate drive signal Sn that is generated by the control unit 8. In addition, the first and second switches TR1 and TR2 are controlled to be turned on and off, or off and on, by turns, respectively.

A smoothing capacitor C is provided between the output terminal OUT and the reference power supply voltage (for example, ground), and a smoothing circuit is constituted by the output inductor L and the smoothing capacitor C.

Figure 1:
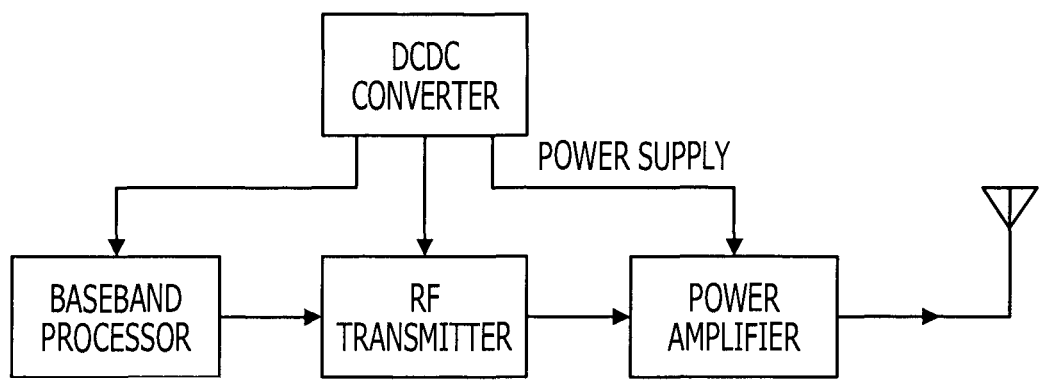
FIG. 1 illustrates a block diagram of a common wireless transmission terminal.
Figure 2:
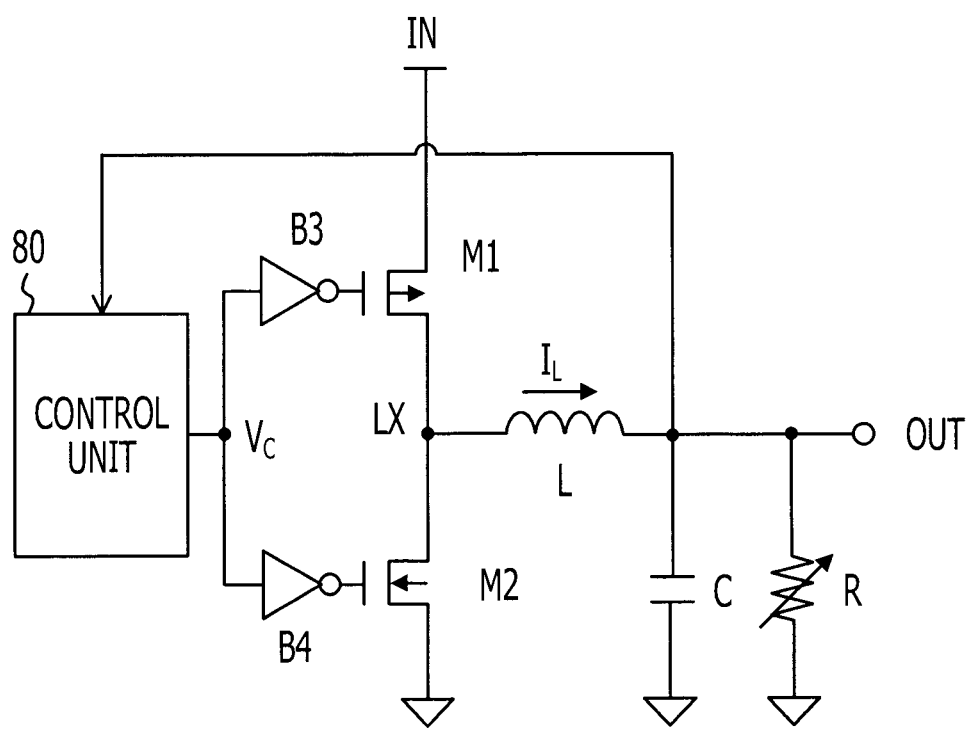
FIG. 2 illustrates a circuit diagram of a common DC-DC converter.

A resistor R that is connected to the output terminal OUT represents a load circuit of an internal LSI, or of the mobile terminal, etc. that is illustrated in FIG. 1 that is operated by receiving voltage supply from the DC-DC converter.

A switch SW 16 is inserted between the output terminal of the comparator 15, and the non-inverting input terminal of a comparator 15 and a capacitance C18. A switch SW 17 is inserted between the other terminal of the capacitance C18 and the connection node LX or between the other terminal of the capacitance C18 and the reference power supply voltage.

On the other hand, variable voltage Vr is supplied to the inverting input terminal of the comparator 15. The output terminal of the comparator 15 is connected to a clock terminal of a flip-flop FF 20, and when the output signal VC of the comparator 15 is inverted, the signal is latched by the flip-flop FF 20, and feedback for turning off the second switch TR2 is performed.

A control circuit that controls a power-down signal PD and the switches SW 16 and 17 is integrated in a logic circuit 19. The comparator 15 can be operated during a time period during which a detection signal Spfm that is output after detecting the light load state by the control unit 8 is input, and a time period until the output signal VC of the comparator 15 is inverted.

Figure 5A:
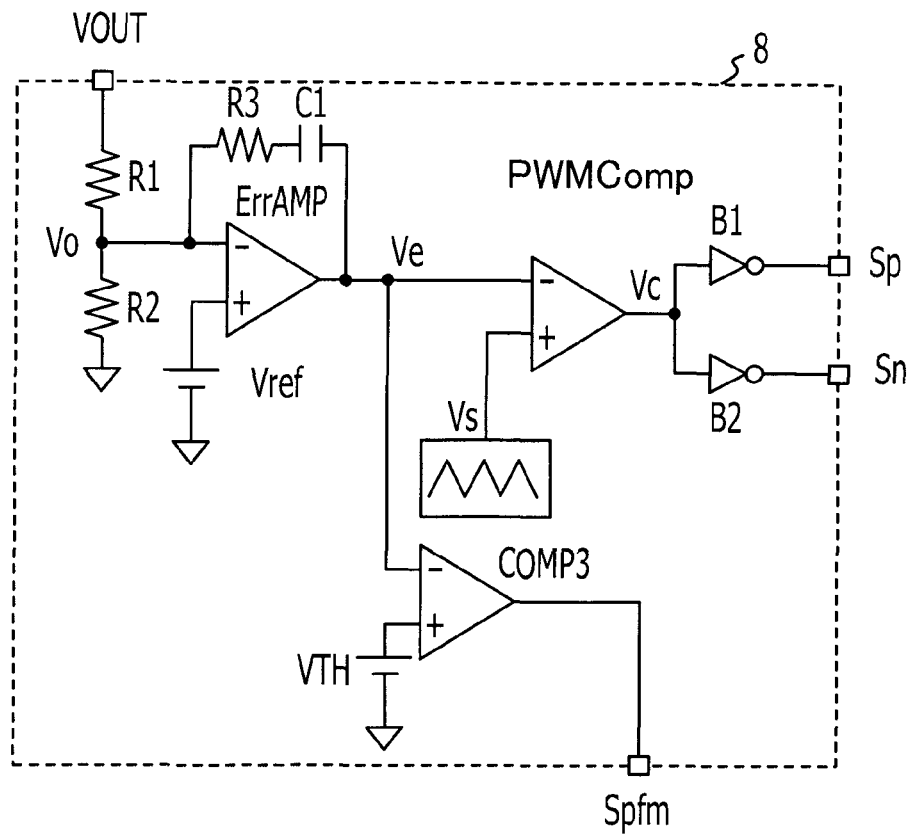
FIGS. 5A and 5B illustrate diagrams of an operation of a control unit according the first embodiment.

FIG. 5A is a circuit block diagram illustrating an example of the control unit 8. In an error amplifier (ErrAMP), a differential voltage between feedback voltage V0 that is obtained by R1 and R2 as divided voltage of Vout, and target reference voltage Vref is integrated by a capacitor C1 that is connected between the inverting input terminal and the output terminal. A resistor R3 is inserted to the ErrAMP for phase compensation.

The output voltage Ve of the ErrAMP is input to the inverting input terminal of a pulse width modulation comparator (PWM Comp). The PWM Comp compares the difference between Ve and a triangular wave Vs, and generates a PWM signal Vc. Drive control circuits B1 and B2 drive the first switch TR1 and the second switch depending on the signal Vc.

When the output voltage Vout is lower than the target voltage, PWM Comp increases a time (duty) during which the PWM signal Vc is in a high level depending on the Ve potential. The drive control circuits B1 and B2 sets the gate drive signals Sp and Sn and adjusts a time during which the first switch TR1 is turned on and a time during which the second switch TR2 is turned off, depending on the duty.

In addition, a comparator Comp 3 compares the potential Ve with threshold voltage Vth to detect the light load state.

Figure 5B:
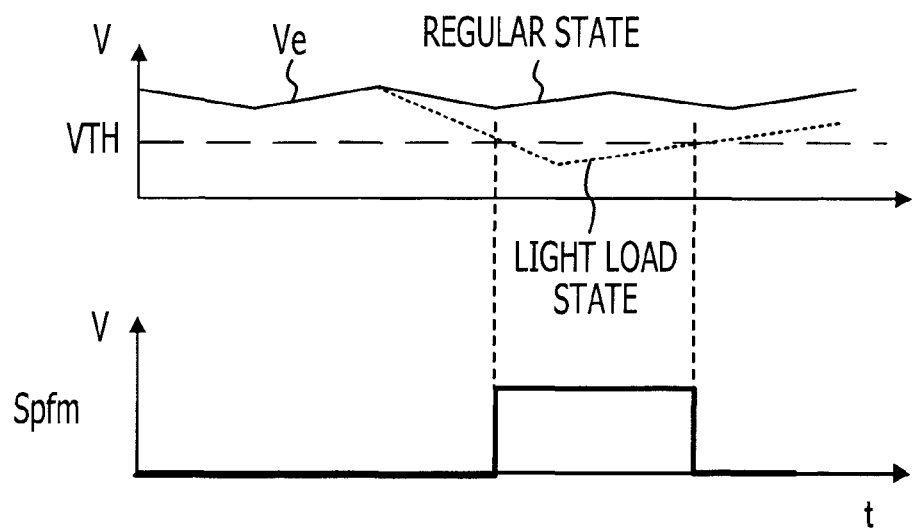

An operation of the Comp 3 is shown as FIG. 5B. FIG. 5B illustrates an operation waveform in the light load state. In the light load state, in the DC-DC converter, output voltage Vout increases, and feedback voltage V0 on which resistance dividing is performed in the feedback resistors R1 and R2 also increases. At this time, the voltage of Ve of the ErrAMP is reduced. When the Ve is lower than the threshold voltage Vth, output of the Comp 3, that is, an Spfm signal that is a detection signal in the light load state is turned from a low level to a high level.

The comparator 15 that is illustrated in FIG. 4 according to the first embodiment includes a function to perform the detection operation when the output Spfm signal of the Comp 3 is a high level and to suppress power consumption when the output Spfm signal of the Comp 3 is a low level.

Figure 6A:
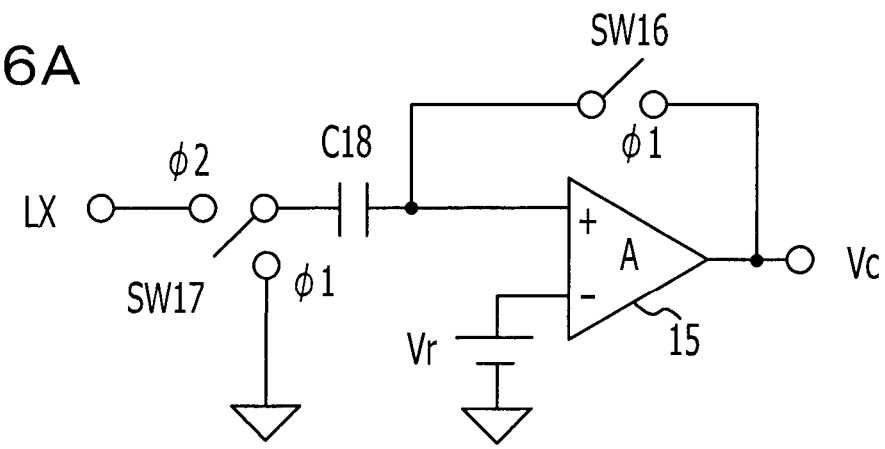
FIGS. 6A to 6C illustrate diagrams of an operation of a comparator according to the first embodiment and the peripheral circuit.
Figure 6B:
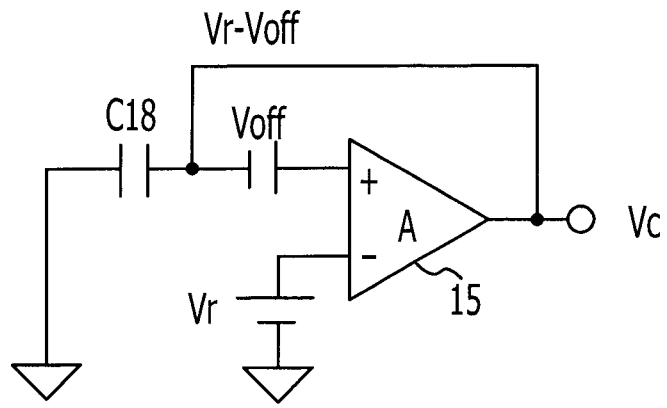
Figure 6C:
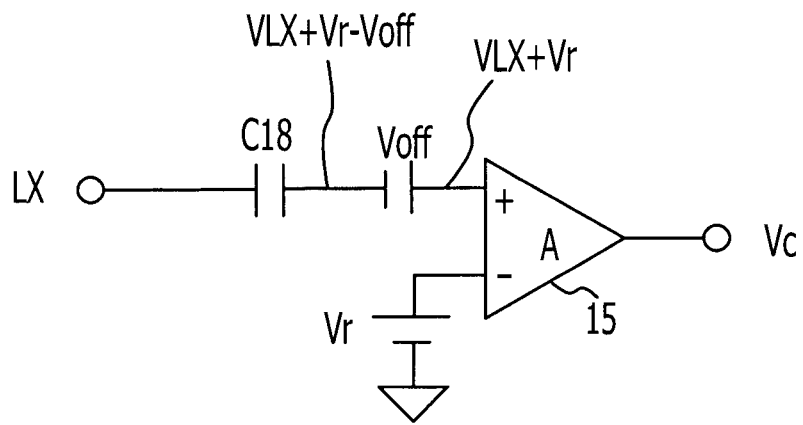
Figure 7:
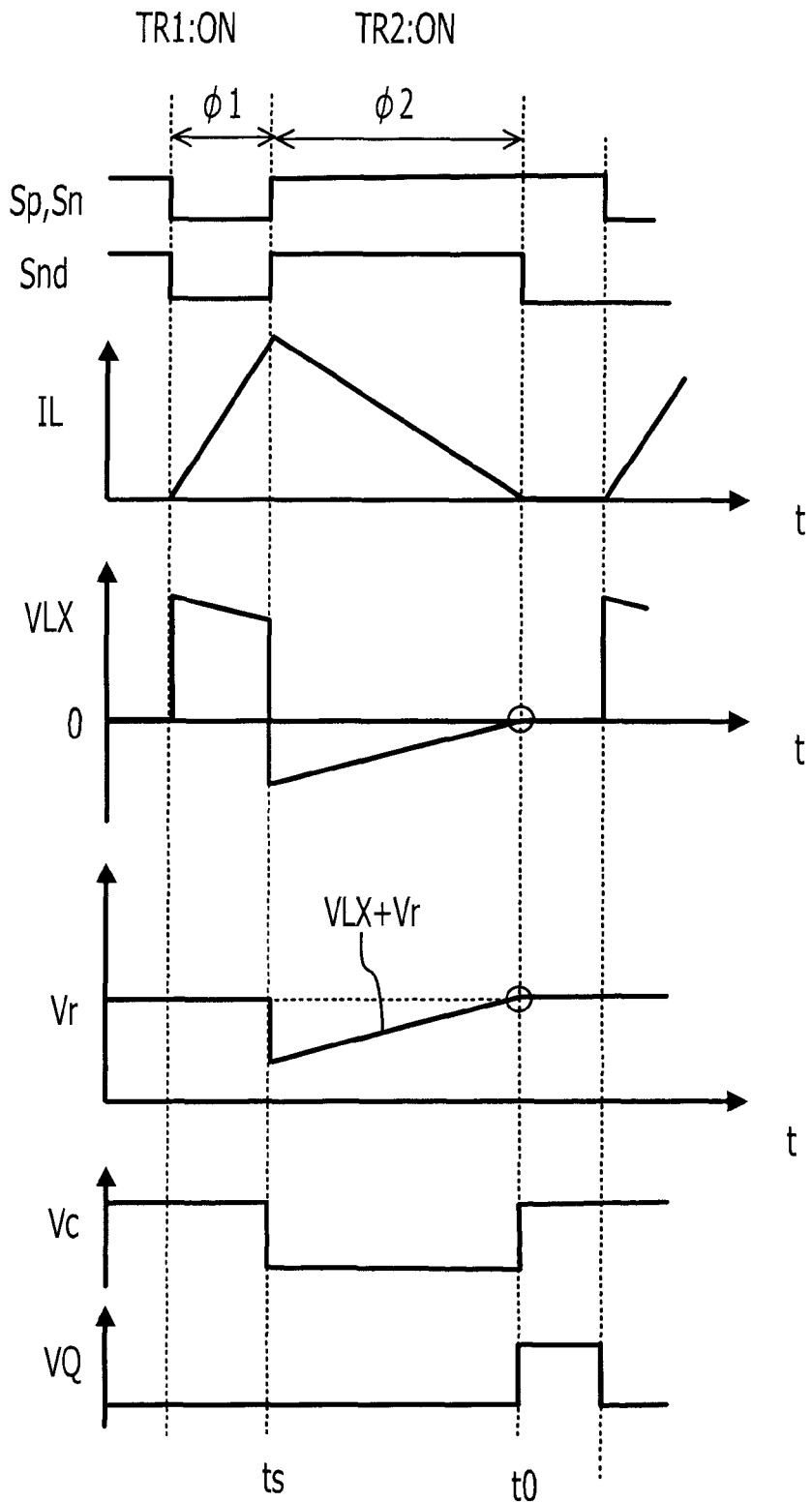
FIG. 7 illustrates a time chart of an operation of a circuit according to the first embodiment.

An operation in the light load state in the first embodiment is described with reference to FIGS. 6A to 6C and 7. FIG. 6A illustrates a circuit block and the peripheral circuit of the comparator 15, and FIGS. 6B and 6C illustrate equivalent circuit diagrams of an operation status of the comparator 15. FIG. 7 illustrates a time chart of an operation of a circuit according to the embodiment.

As illustrated in FIG. 6A, the switch SW 16 that connects the output terminal and the non-inverting input terminal of the comparator 15, and the capacitance C18 are connected to the non-inverting input terminal of the comparator 15. A switch SW 17 is inserted between the other terminal of the capacitance C18 and the connection node LX or between the other terminal of the capacitance C18 and the reference power supply voltage.

When signals Sp and Sn that are output from the control unit 8 is in a low level, the first switch TR1 is turned on, the second switch TR2 is turned off, and as illustrated in FIG. 7, the output inductor current IL is charged to the smoothing capacitor C by with a positive slope.

The time period is set as φ1. In the time period of φ1, the comparator 15 is in an auto-zero mode. FIG. 6B illustrates an equivalent circuit of the comparator 15 in the auto-zero mode. By depending on a signal Sn that is output from the control unit 8, the switch SW 16 is turned on, the output terminal of the comparator 15 is short-circuited to one terminal of the capacitance C18 and the non-inverting input terminal of the comparator 15. In addition, the other terminal of the capacitance C18 is short-circuited to the reference power supply voltage by the switch SW 17. A reference potential Vr is supplied to the inverting input terminal of the comparator 15.

Here, in a case in which the offset of the comparator 15 is set as Voff, in which it is assumed that the offset exists in the input of the non-inverting input terminal, and in which gain of the comparator is represented by "A(>>1)". In this case, the output voltage Vc of the comparator 15 shown in FIG. 6B is obtained as follows, "−A (Vc+Voff−Vr)=Vc (1)", that is, "Vc=A (Vr−Voff)/(1+A)≈Vr−Voff (2)" during the time period of φ1.

Thus, the potential difference of "Vr−Voff" is applied to the both terminals of the capacitance C18.

Next, when the signals Sp and Sn that are output from the control unit 8 are changed from a low level to a high level, the first switch TR1 is turned off, the second switch TR2 is turned on, and as illustrated in FIG. 7, the output inductor current IL is operated with a negative slope.

The time period is set as φ2. In the time period of φ2, the comparator 15 is in a comparison mode. FIG. 6C illustrates an equivalent circuit of the comparator 15 in the comparison mode. The switch SW 16 is turned off, the output terminal of the comparator 15 is in a state of being insulated from the one terminal of the capacitance C18 and the non-inverting input terminal of the comparator 15. In addition, the other terminal of the capacitance C18 is short-circuited to the LX node that is connected between the first switch TR1 and the second switch TR2 by the switch SW 17.

In the time period of φ1, the potential difference of "Vr−Voff" is applied to the both terminals of the capacitance C18, and even in the time period of φ2, the potential difference of "Vr−Voff" is applied to the both terminals of the capacitance C18 because the charge is maintained due to the charge conservation when there is no discharge path in the switch. Thus, when the LX has voltage VLX, the voltage of one terminal of the capacitance 18 is represented by "VLX+Vr−Voff".

Thus, voltage of "VLX+Vr" is supplied to the input terminal of the non-inverting input terminal of the comparator 15, and the comparator 15 may detect a difference between "VLX+Vr" and "Vr", that is, the polarity of VLX without depending on the offset Voff.

In the time period of φ2, when the output inductor current IL becomes zero and the node potential VLX is turned from negative to positive, an output signal VC of the comparator 15 is inverted from a low level to a high level. After that, by the flip-flop FF 20, an output signal VQ is latched to the high level. A Snd signal that controls the second switch TR2 is generated by using the VQ and a signal Sn from the control unit 8 as shown in FIG. 4. When the output signal VQ becomes to be a high level, the Snd signal is inverted to a low level, and the second switch TR2 is turned off. Therefore, a discharge path through the second switch TR2 from the smoothing capacitor C is cut off.

At this time, the output signal VQ of the flip-flop FF 20 is also input to the logic circuit 19, and the comparator 15 is controlled to be in the power-down mode once by a power-down signal PD that is output from the logic circuit 19. The state is maintained until the flip-flop FF 20 is reset in the next time period of φ1.

In the circuit according to the first embodiment, as illustrated in FIG. 7, timing t0 of zero-crossing in which the node voltage VLX becomes zero is accurately detected, and the second switch TR2 may be turned off by an Snd signal before the time period of φ2 ends, so that discharge from the smoothing capacitor C may be reduced in the light load state. Therefore, loss of electric power may be reduced.

According to the first embodiment, the comparison operation may be performed in the state in which the influence of offset Voff that exists in the comparator 15 is reduced, so that zero-crossing detection of the VLX may be performed accurately. Thus, as compared with a case a regular comparator is used, zero-crossing error that corresponds to an offset potential that typically exists in the comparator may be reduced, and loss of electric power may be reduced. In addition, the comparator 15 may be operated as appropriate and the power consumption may be reduced by controlling the comparator 15 with a detection signal Spfm that is output by detecting the light load state.

Figure 8:
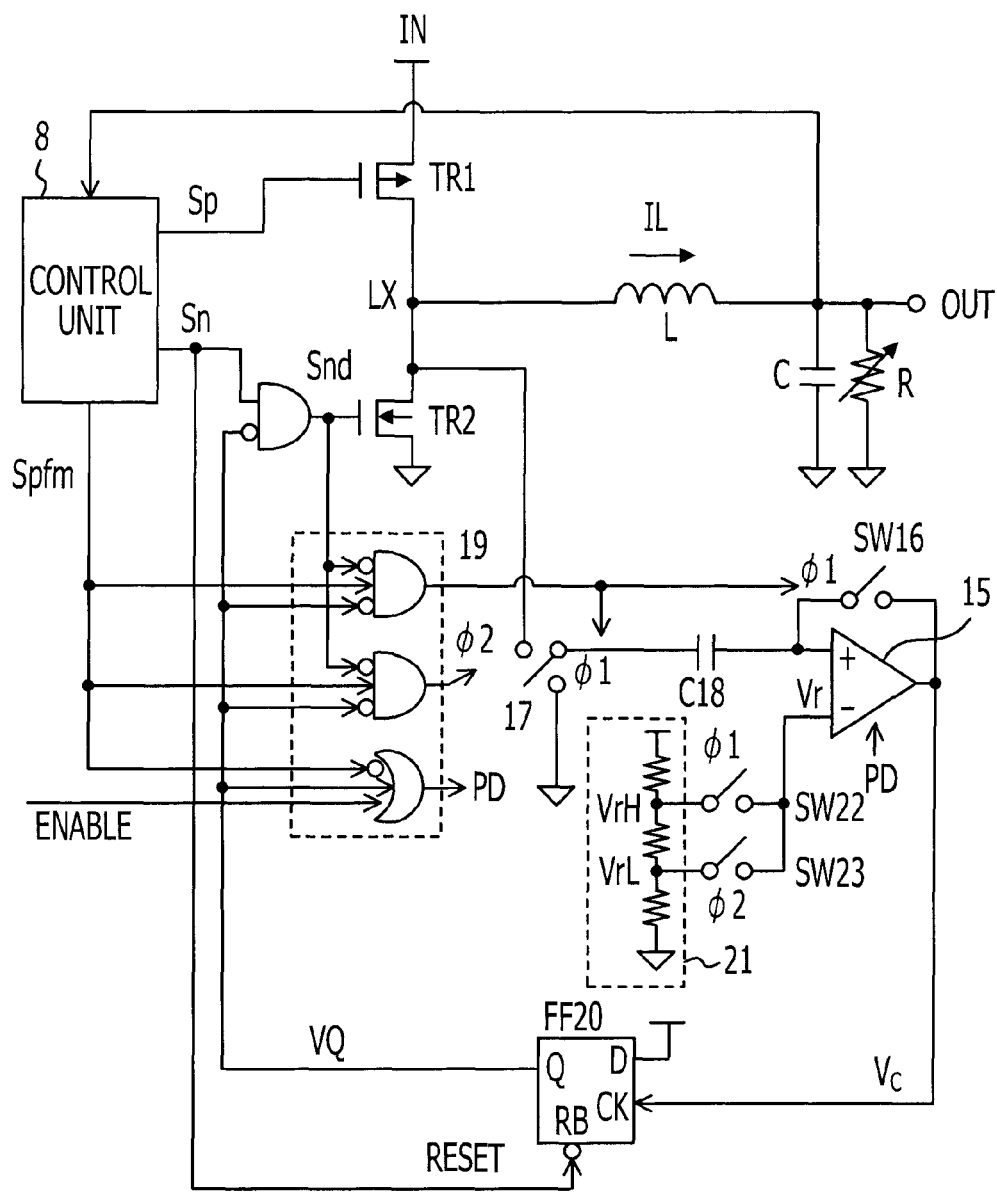
FIG. 8 illustrates a circuit diagram of a DC-DC converter according to a second embodiment.

Next, a DC-DC converter according to a second embodiment is described with reference to FIG. 8. The same numbers are given to the same configuration elements as that according to the first embodiment in FIG. 4.

Figure 9A:
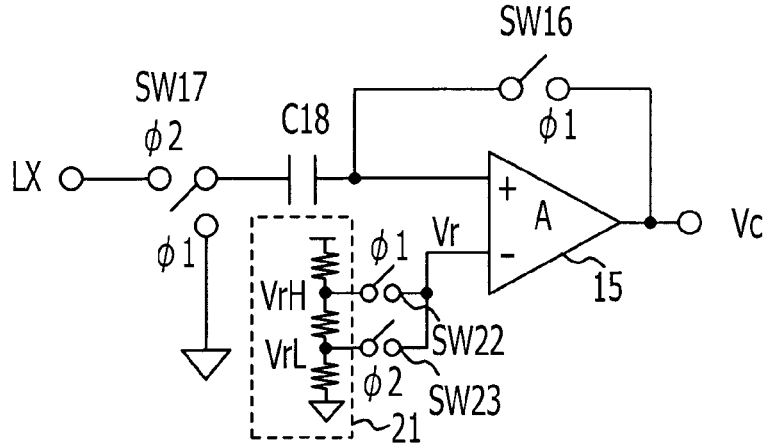
FIG. 9A to 9C illustrate diagrams of an operation of a comparator according to the second embodiment and the peripheral circuit.

The DC-DC converter according to a second embodiment is different from the DC-DC converter according to the first embodiment in that, as illustrated in FIG. 9A, a variable voltage supply 21 is connected to the inverting input terminal of the comparator 15. The variable voltage supply 21 is, for example, a circuit that is constituted by a resistor ladder, switches DC voltage by the switches SW 22 and SW 23, and supplies the switched DC voltage to the inverting input terminal of the comparator 15. The switches SW 22 and SW 23 are turned on at a timing of φ1 and φ2, respectively.

Figure 9B:
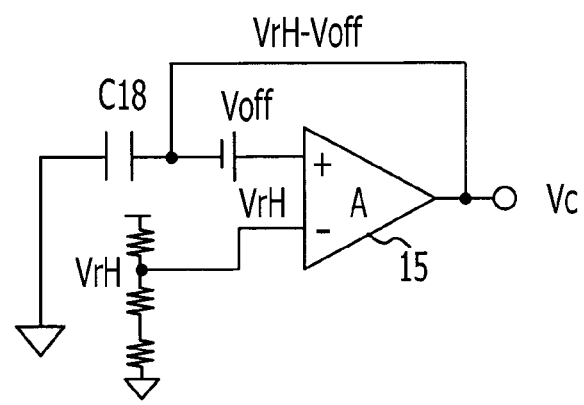
Figure 9C:
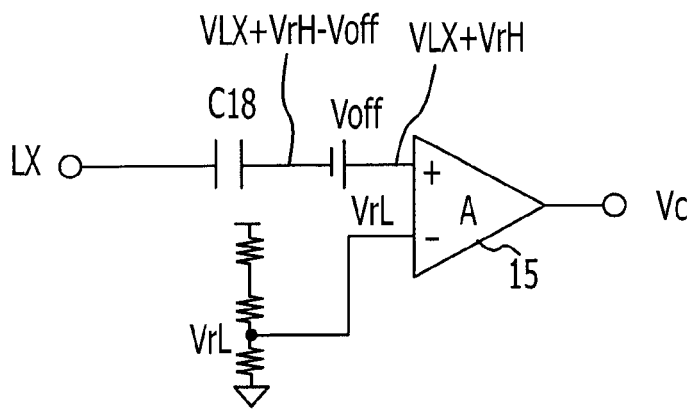
Figure 10:
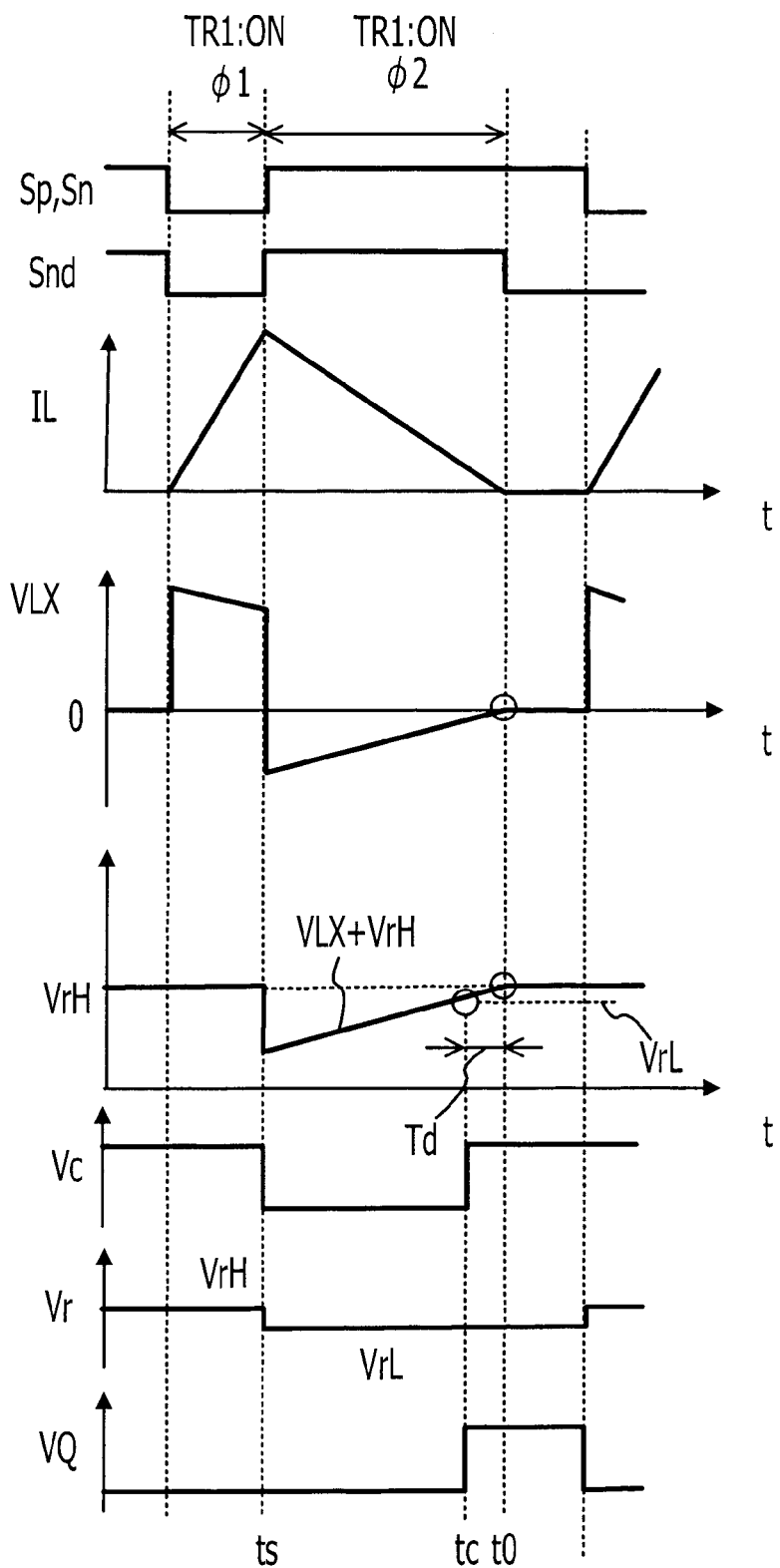
FIG. 10 illustrates a time chart of an operation of a circuit according to the second embodiment.

An operation in the light load state in the second embodiment is described with reference to FIGS. 9A to 9C and 10. FIG. 9A illustrates a circuit block and the peripheral circuit of the comparator 15, and FIGS. 9B and 9C illustrate equivalent circuit diagrams of an operation status of the comparator 15. FIG. 10 illustrates a time chart of an operation of a circuit according to the second embodiment.

As illustrated in FIG. 9A, the switch SW 16 that connects the output terminal and the non-inverting input terminal of the comparator 15, and the capacitance C18 are connected to the non-inverting input terminal of the comparator 15. A switch SW 17 is inserted between the other terminal of the capacitance C18 and the connection node LX or between the other terminal of the capacitance C18 and the reference power supply voltage. The variable voltage supply 21 is connected to the inverting input terminal of the comparator 15 through the switches SW 22 and SW 23. The switch SW 22 is turned on in the time period of φ1 during which a signal Sn that is output from the control unit 8 is in a low level, and supplies voltage VrH that is output from the variable voltage supply 21 to the inverting input terminal of the comparator 15. In addition, the switch SW 23 is turned on in the time period of φ2 during which a signal Sn that is output from the control unit 8 is in a high level, and supplies voltage VrL that is output from the variable voltage supply 21 to the inverting input terminal of the comparator 15. The voltage VrL is lower than voltage VrH.

Similar to the case that is described in the first embodiment, "φ1" is a time period during which a signal Sn is in a low level. At this time, the comparator 15 is in the auto-zero mode. FIG. 9B illustrates an equivalent circuit of the comparator 15 in the auto-zero mode. The switch SW 16 is turned on, and the output terminal of the comparator 15 is short-circuited to the one terminal of the capacitance C18 and the non-inverting input terminal of the comparator 15. In addition, the other terminal of the capacitance C18 is short-circuited to the reference power supply voltage by the switch SW 17.

The voltage VrH is supplied to the inverting input terminal of the comparator 15 in the time period of φ1 when the switch SW 22 is turned on. That is, the output voltage Vc of the comparator 15 shown in FIG. 9B is obtained as follows, "Vc=A (VrH−Voff)/(1+A)≈VrH−Voff" (3) during the time period of φ1.

On the other hand, "φ2" is a time period during which a signal Sn that is output from the control unit 8 is in a high level, the comparator 15 is in the comparison mode. FIG. 9C illustrates an equivalent circuit of the comparator 15 in the comparison mode. The switch SW 16 is turned off, and the output terminal of the comparator 15 is in a state of being insulated from the one terminal of the capacitance C18 and the non-inverting input terminal of the comparator 15. In addition, the other terminal of the capacitance C18 is short-circuited to the LX node that is connected between the first switch TR1 and the second switch TR2 by the switch SW 17.

Referring to FIG. 10, when φ1 is changed to φ2 at a timing of ts, the switch SW 22 is turned off, the switch SW 23 is turned on, and the voltage VrL is supplied to the inverting input terminal of the comparator 15. That is, a potential of the inverting input terminal of the comparator 15 is reduced from a potential of high VrH to a potential of low VrL.

Similar to the description in the first embodiment, a potential difference between the both terminals of the capacitance C18 of the comparator 15 is represented by "VLX+VrH" because the one terminal is changed to VLX and the other terminal is changed to "VrH−Voff" as represented by the equation (3).

On the other hand, an input voltage difference of the comparator 15 is represented by "VLX+VrH−VrL" because the non-inverting input terminal of the comparator 15 is changed to the VrL in the time period of φ2. The comparator 15 inverts the output when "VLX+VrH−VrL=0" is satisfied, that is, detects a time in which "VLX=−(VrH−VrL)" is satisfied.

That is, referring to FIG. 10, the comparator 15 detects not timing t0 at which the VLX is zero, but timing tc at which "VLX=−(VrH−VrL)" is satisfied.

In the first embodiment, delay until the second switch TR2 is turned off after the comparator 15 accurately detects the timing t0 of zero-crossing at which the node voltage VLX is zero is not considered. In the second embodiment, the variable voltage supply 21 is adjusted so that a signal is inverted not at the timing t0, but at the timing tc faster to the timing t0 while considering the delay time. Therefore, even when the signal Snd is delayed by Td, timing at which a gate control signal of the second switch TR2 is in a low level may be matched with the timing t0.

Figure 3:
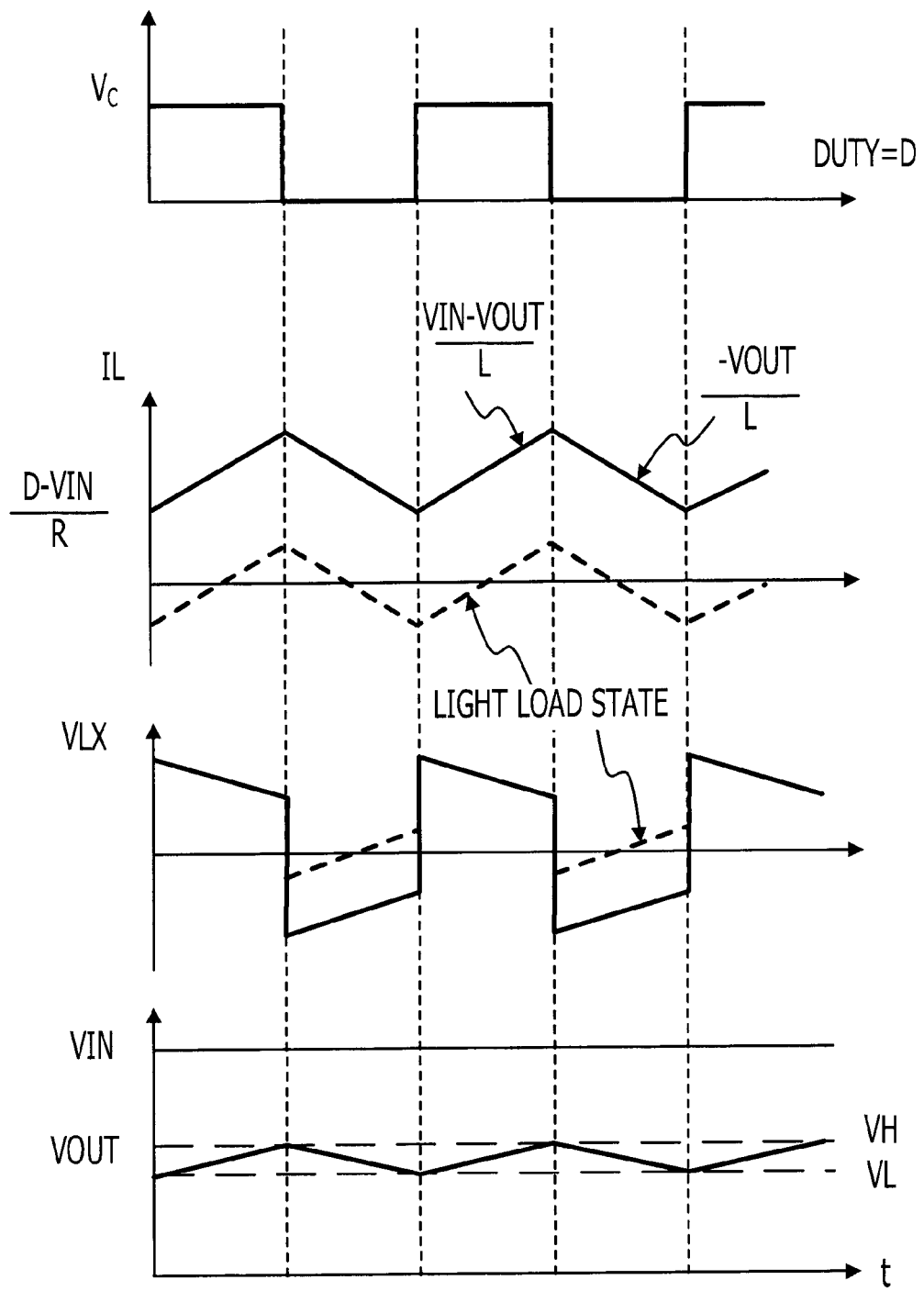
FIG. 3 illustrates a timing chart describing a problem at a light load state and at a no-load state.

In the end, a setting method of voltage of VrH and VrL is described. In the time period of φ2, "(voltage of VLX)= (current of IL)*(on-resistance of the second switch TR2) (4)" is obtained. As illustrated in FIG. 3, because an absolute value of a slope of the output inductance current IL is VOUT/L, when the on-resistance of the second switch TR2 is represented by RON, the relationship of the delay time Td that illustrated in FIG. 10 and "VrH−VrL" may be obtained by the following equation.

"(VrH−VrL)=(VOUT/L)*Td*RON(5)" is satisfied. For example, when "VOUT=3 V", "L=0.1 µH", "Td=5 ns", and "RON=0.1Ω" are satisfied, "(VrH−VrL)=15 mV" is obtained, and the potential difference may be set by the variable voltage supply 21 by use of the switches SW 22 and SW 23.

According to the second embodiment, the influence of the offset Voff that exists in the comparator 15, and the influence of a delay time from the output of the comparator 15 to the input of the second switch TR2 through the logic circuit may be reduced by providing a variable voltage in the inverting input terminal of the comparator 15, thereby obtaining an appropriate zero-crossing point.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply circuit comprising:
a first switch and a second switch that are connected in series between an input voltage terminal and a reference power supply;
a controller that controls the first and second switches to be turned on and off by turns;
a comparator that has an inverting input terminal connected to a voltage supply and that has a non-inverting input terminal connected to a first terminal of a capacitor;
a third switch that is provided between an output terminal and the non-inverting input terminal of the comparator;
a fourth switch that is provided between a connection node of the first and second switches, and a second terminal of the capacitor; and
a latch circuit that detects change of output of the output terminal of the comparator and controls the second switch to be turned off.

2. The power supply circuit according to claim 1, wherein
in a case in which the first switch is turned on, the third switch is controlled to be turned on, the output terminal and the non-inverting input terminal of the comparator are short-circuited, and the fourth switch is controlled such that the second terminal of the capacitor is connected to a reference potential, and
in a case in which the second switch is turned on, the third switch is controlled to be turned off, and the fourth switch is controlled such that the second terminal of the capacitor is connected to the connection node of the first and second switches.

3. The power supply circuit according to claim 1 further comprising
a comparison circuit that compares an output voltage of the power supply circuit with a certain reference voltage, wherein
the comparator, the third switch, and the fourth switch are operated when the output voltage of the power supply circuit becomes greater than the certain reference voltage.

4. A power supply circuit comprising:
a first switch and a second switch that are connected in series between an input voltage terminal and a reference power supply;
a controller that controls the first and second switches to be turned on and off by turns;
a comparator that has an inverting input terminal connected to a voltage supply and that has a non-inverting input terminal connected to a first terminal of a capacitor; and
a latch circuit that detects change of output of the output terminal of the comparator and controls the second switch to be turned off, wherein
in a case in which the first switch is turned on, the first terminal of the capacitor is charged at voltage that corresponds to the sum of voltage of the voltage supply and offset voltage of the comparator, and
in a case in which the second switch is turned on, a second terminal of the capacitor is set at voltage of a connection node of the first and second switches, the first terminal of the capacitor is charged at voltage that correspond to the sum of the voltage of the voltage supply, the offset voltage of the comparator, and the voltage of the connection node, and voltage of the non-inverting input terminal and voltage of the inverting input terminal are compared in the comparator.

5. The power supply circuit according to claim 4, wherein
in a case in which the second switch is turned on, the latch circuit controls the second switch to be turned off when the voltage of the non-inverting input terminal of the comparator is equal to the voltage of the inverting input terminal of the comparator.

6. A power supply circuit comprising:
a first switch and a second switch that are connected in series between an input voltage terminal and a reference power supply;
a controller that controls the first and second switches to be turned on and off by turns;
a comparator that has an inverting input terminal connected to a variable voltage supply and that has a non-inverting input terminal connected to a first terminal of a capacitor;
a third switch that is provided between an output terminal and the non-inverting input terminal of the comparator;
a fourth switch that is provided between a connection node of the first and second switches, and a second terminal of the capacitor;
a fifth switch that is provided between the inverting input terminal and a first voltage output terminal of the variable voltage supply;
a sixth switch that is provided between the inverting input terminal and a second voltage output terminal of the variable voltage supply; and
a latch circuit that detects change of output of the output terminal of the comparator and controls the second switch to be turned off.

7. The power supply circuit according to claim 6, wherein
in a case in which the first switch is turned on, the third switch is controlled to be turned on, the output terminal and the non-inverting input terminal of the comparator are short-circuited, the fourth switch is controlled such that the second terminal of the capacitor is connected to a reference potential, the fifth switch is controlled to be turned on, and the inverting input terminal is connected to the first voltage output terminal of the variable voltage supply, and
in a case in which the second switch is turned on, the third switch is controlled to be turned off, the fourth switch is controlled such that the second terminal of the capacitor is connected to the connection node of the first and second switches, the sixth switch is controlled to be turned on, and the inverting input terminal is connected to the second voltage output terminal of the variable voltage supply.

8. The power supply circuit according to claim 6 further comprising:
a comparison circuit that compares an output voltage of the power supply circuit with a certain reference voltage, wherein
the comparator, the third switch, and the fourth switch are operated when the output voltage of the power supply circuit becomes greater than the certain reference voltage.

9. A power supply circuit comprising:
a first switch and a second switch that are connected in series between an input voltage terminal and a reference power supply;
a controller that controls the first and second switches to be turned on and off by turns;
a comparator that has an inverting input terminal connected to a variable voltage supply and that has a non-inverting input terminal connected to a first terminal of a capacitor; and
a latch circuit that detects change of output of the output terminal of the comparator and controls the second switch to be turned off, wherein in a case in which the first switch is turned on, the inverting input terminal of the comparator is set at first voltage that is output from the variable voltage supply, and the first terminal of the capacitor is charged at voltage that is equal to the sum of the first voltage and offset voltage of the comparator, and in a case in which the second switch is turned on, the inverting input terminal of the comparator is set at second voltage that is output from the variable voltage supply, a second terminal of the capacitor is set at voltage of a connection node of the first and second switches, the first terminal of the capacitor is charged at voltage that is equal to the sum of the first voltage, the offset voltage, and the voltage of the connection node, and voltage of the non-inverting input terminal and voltage of the inverting input terminal are compared in the comparator.

10. The power supply circuit according to claim 9, wherein in a case in which the second switch is turned on, the latch circuit controls the second switch to be turned off when the voltage of the non-inverting input terminal of the comparator is equal to the voltage of the inverting input terminal of the comparator.

11. A mobile terminal comprising:
a power supply circuit that includes:
a first switch and a second switch that are connected in series between an input voltage terminal and a reference power supply,
a controller that controls the first and second switches to be turned on and off by turns,
a comparator that has an inverting input terminal connected to a voltage supply and that has a non-inverting input terminal connected to a first terminal of a capacitor,
a third switch that is provided between an output terminal and the non-inverting input terminal of the comparator,
a fourth switch that is provided between a connection node of the first and second switches, and a second terminal of the capacitor, and
a latch circuit that detects change of output of the output terminal of the comparator and controls the second switch to be turned off; and
a load circuit that operates by receiving power supply from the power supply circuit.

12. A mobile terminal comprising:
a power supply circuit that includes:
a first switch and a second switch that are connected in series between an input voltage terminal and a reference power supply,
a controller that controls the first and second switches to be turned on and off by turns,
a comparator that has an inverting input terminal connected to a variable voltage supply and that has a non-inverting input terminal connected to a first terminal of a capacitor,
a third switch that is provided between an output terminal and the non-inverting input terminal of the comparator,
a fourth switch that is provided between a connection node of the first and second switches, and a second terminal of the capacitor,
a fifth switch that is provided between the inverting input terminal and a first voltage output terminal of the variable voltage supply,
a sixth switch that is provided between the inverting input terminal and a second voltage output terminal of the variable voltage supply, and
a latch circuit that detects change of output of the output terminal of the comparator and controls the second switch to be turned off; and
a load circuit that operates by receiving power supply from the power supply circuit.

13. A control method of a power supply circuit that includes a first switch and a second switch that are connected in series between an input voltage terminal and a reference power supply, a controller that controls the first and second switches to be turned on and off by turns, a comparator an inverting input terminal of which is connected to a voltage supply and a non-inverting input terminal of which is connected to a first terminal of a capacitor, and a latch circuit that detects change of output of the output terminal of the comparator and controls the second switch to be turned off, the control method comprising:
charging the first terminal of the capacitor at voltage that corresponds to the sum of voltage of the voltage supply and offset voltage of the comparator, in a case in which the first switch is turned on; and
setting a second terminal of the capacitor at voltage of a connection node of the first and second switches, charging the first terminal of the capacitor at voltage that correspond to the sum of the voltage of the voltage supply, the offset voltage of the comparator, and the voltage of the connection node, and comparing voltage of the non-inverting input terminal with voltage of the inverting input terminal in the comparator, in a case in which the second switch is turned on.

14. A control method of a power supply circuit that includes a first switch and a second switch that are connected in series between an input voltage terminal and a reference power supply, a controller that controls the first and second switches to be turned on and off by turns, a comparator an inverting input terminal of which is connected to a variable voltage supply and a non-inverting input terminal of which is connected to a first terminal of a capacitor, and a latch circuit that detects change of output of the output terminal of the comparator and controls the second switch to be turned off, the control method comprising:
setting the inverting input terminal of the comparator at first voltage that is output from the variable voltage supply, and charging the first terminal of the capacitor at voltage that is equal to the sum of the first voltage and offset voltage of the comparator, in a case in which the first switch is turned on; and
setting the inverting input terminal of the comparator at second voltage that is output from the variable voltage supply, setting a second terminal of the capacitor at voltage of a connection node of the first and second switches, charging the first terminal at voltage that is equal to the sum of the first voltage, the offset voltage, and the voltage of the connection node, and comparing voltage of the non-inverting input terminal with voltage of the inverting input terminal in the comparator, in a case in which the second switch is turned on.

* * * * *